United States Patent [19]

Clancy et al.

[11] Patent Number: 4,499,604
[45] Date of Patent: Feb. 12, 1985

[54] DIGITAL DATA PROCESSING SYSTEM FOR EXECUTING INSTRUCTIONS CONTAINING OPERATION CODES BELONGING TO A PLURALITY OF OPERATION CODE SETS AND NAMES CORRESPONDING TO NAME TABLE ENTRIES

[75] Inventors: Gerald F. Clancy, Saratoga, Calif.; Ronald H. Gruner, Cary, N.C.; Stephen I. Schleimer, Chapel Hill, N.C.; Craig J. Mundie, Cary, N.C.; Steven J. Wallach, Saratoga, Calif.; Walter A. Wallach, Jr., Raleigh, N.C.; John K. Ahlstrom, Mountain View, Calif.; Michael S. Richmond, Pittsboro, N.C.; David H. Bernstein, Ashland; Richard G. Bratt, Wayland, both of Mass.

[73] Assignee: Data General Corporation, Westboro, Mass.

[21] Appl. No.: 266,423

[22] Filed: May 22, 1981

[51] Int. Cl.³ .............................................. G06F 9/30
[52] U.S. Cl. .................................................. 364/200
[58] Field of Search .......................... 364/200, 900, 300

[56] References Cited

U.S. PATENT DOCUMENTS

| | | | |
|---|---|---|---|
| 3,983,539 | 9/1976 | Faber et al. | 364/200 |
| 4,025,901 | 5/1977 | Bachman et al. | 364/200 |
| 4,130,867 | 12/1978 | Bachman et al. | 364/200 |
| 4,138,719 | 2/1979 | Swanstrom et al. | 364/200 |
| 4,215,406 | 7/1980 | Gromola et al. | 364/200 |
| 4,216,528 | 8/1970 | Robertson | 364/200 |
| 4,236,204 | 11/1980 | Groves | 364/200 |
| 4,307,447 | 12/1981 | Provanzano et al. | 364/200 |
| 4,388,682 | 6/1983 | Eldridge | 364/200 |

Primary Examiner—Gareth D. Shaw
Assistant Examiner—Jameson Lee
Attorney, Agent, or Firm—Robert F. O'Connell; Gerald J. Cechony

[57] ABSTRACT

A digital computer system having a memory for storing and providing data including instructions and a processor for processing data in response to the instructions and providing memory operation specifiers to the memory which specify an address of a data item and the memory operation to be performed on it. The instructions in the digital computer system include operation codes belonging to more than one set of operation codes and names representing items to be processed in the operation specified by the operation code. The data in memory further includes name table entries. Each name table entry corresponds to a name and contains information specifying the address of the item represented by the name. The processor includes apparatus for decoding each operation code in response to the operation code and to a dialect value contained in the decoding apparatus which specifies which operation code set the operation code being decoded belongs to. The processor further includes apparatus for processing names by resolving them to produce the addresses specified by their corresponding name table entries and control apparatus responsive to the instruction decoding apparatus and the name processing apparatus for controlling the processor and providing memory operation specifiers containing the addresses produced by the name processing means to the memory.

12 Claims, 4 Drawing Figures

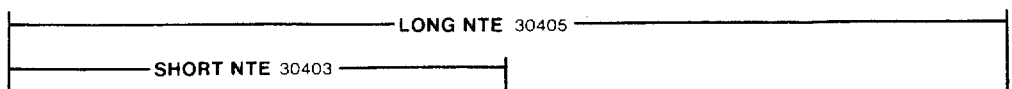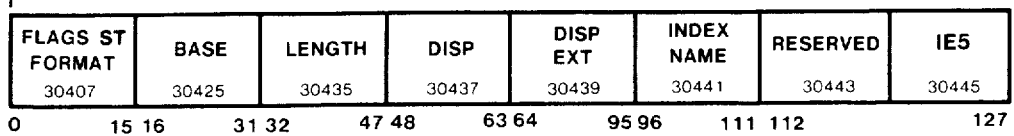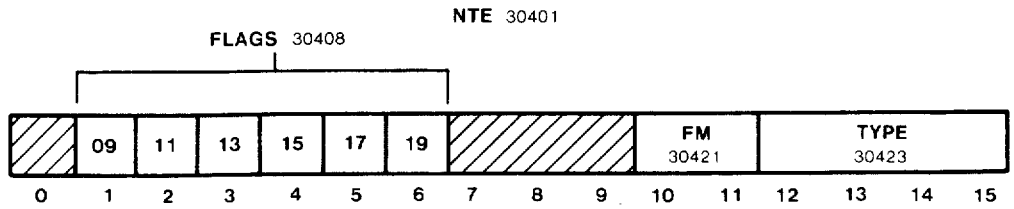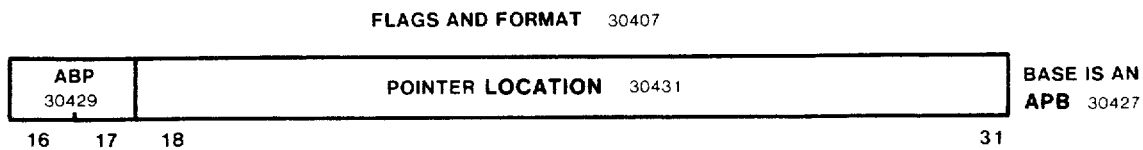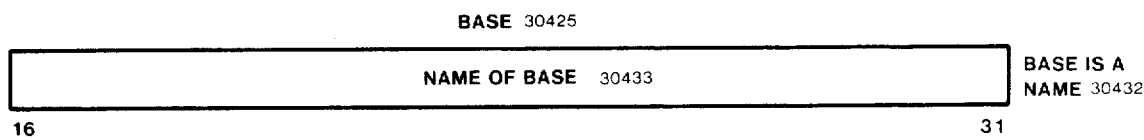
FIG. 304

DIGITAL DATA PROCESSING SYSTEM FOR EXECUTING INSTRUCTIONS CONTAINING OPERATION CODES BELONGING TO A PLURALITY OF OPERATION CODE SETS AND NAMES CORRESPONDING TO NAME TABLE ENTRIES

CROSS REFERENCE TO RELATED APPLICATIONS

The present patent application is closely related to U.S. patent application Ser. Nos. 266,429 and 266,426, both filed on even date with the present application and assigned to the assignee of the present application.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled, internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appered repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates generally to digital computer systems and more specifically to digital computer systems employing instructions containing operand syllables called names and operation codes which may belong to several sets of operation codes. The names represent items of data to be processed in the operation specified by the operation code.

The digital computer system includes a memory for storing and providing items of data including the instructions and a processor connected to the memory. The processor responds to the instructions by processing data and providing memory operation specifiers specifying memory operations and addresses of data to the memory; the memory stores and provides data as specified by the memory operation specifiers.

In addition to the instructions, the data items include name table entries. There is a name table entry corresponding to each name. A name's corresponding name table entry contains information which specifies the address of the item represented by the name.

The processor includes apparatus for decoding the operation codes, apparatus for processing the names to obtain the addresses of the data represented by the names, and apparatus for controlling the processor. The decoding apparatus includes a register containing a dialect value specifying the operation code set to which the operation code currently being decoded belongs. The decoding apparatus decodes the operation code in response to the operation code and the dialect value. The name processing apparatus responds to the names contained in the instructions by resolving each name to produce the address specified by the name table entry corresponding to the name. The apparatus for controlling the processor responds to the operation decoding apparatus and the name processing apparatus by controlling operation of the processor as required to perform the operation specified by the operation code and dialect value. It responds to operation of the name processing apparatus by forming memory operation specifiers including the addresses provided by the name processing apparatus.

It is thus an object of the invention to provide an improved digital data processing system.

It is another object of the invention to provide a digital data processing system having simplified instructions.

It is a further object of the invention to provide a digital data processing system wherein the instructions contain operation code belonging to a plurality of operation code sets and operands whose form does not depend on the operation code set.

It is a still further object of the invention to provide a digital data processing system wherein the instructions contain operation codes belonging to a plurality of operation code sets and names corresponding to name table entries which contain information sopecifying the addresses of the data items represented by the names.

It is yet another object of the invention to provide a processor including apparatus for decoding operation codes belonging to a plurality of operation code sets and apparatus for processing names to obtain the addresses specified by the name table entries corresponding to the names.

Other objects, advantages and features of the present invention will be understood by those of ordinary skill in the art, after referring to the following detailed description of the preferred embodiments and drawings wherein:

BRIEF DESCRIPTION OF DRAWINGS

FIG. 304 is a diagram illustrating name table entries;

DESCRIPTION OF THE PREFERRED EMBODIMENTS

Figure 303:
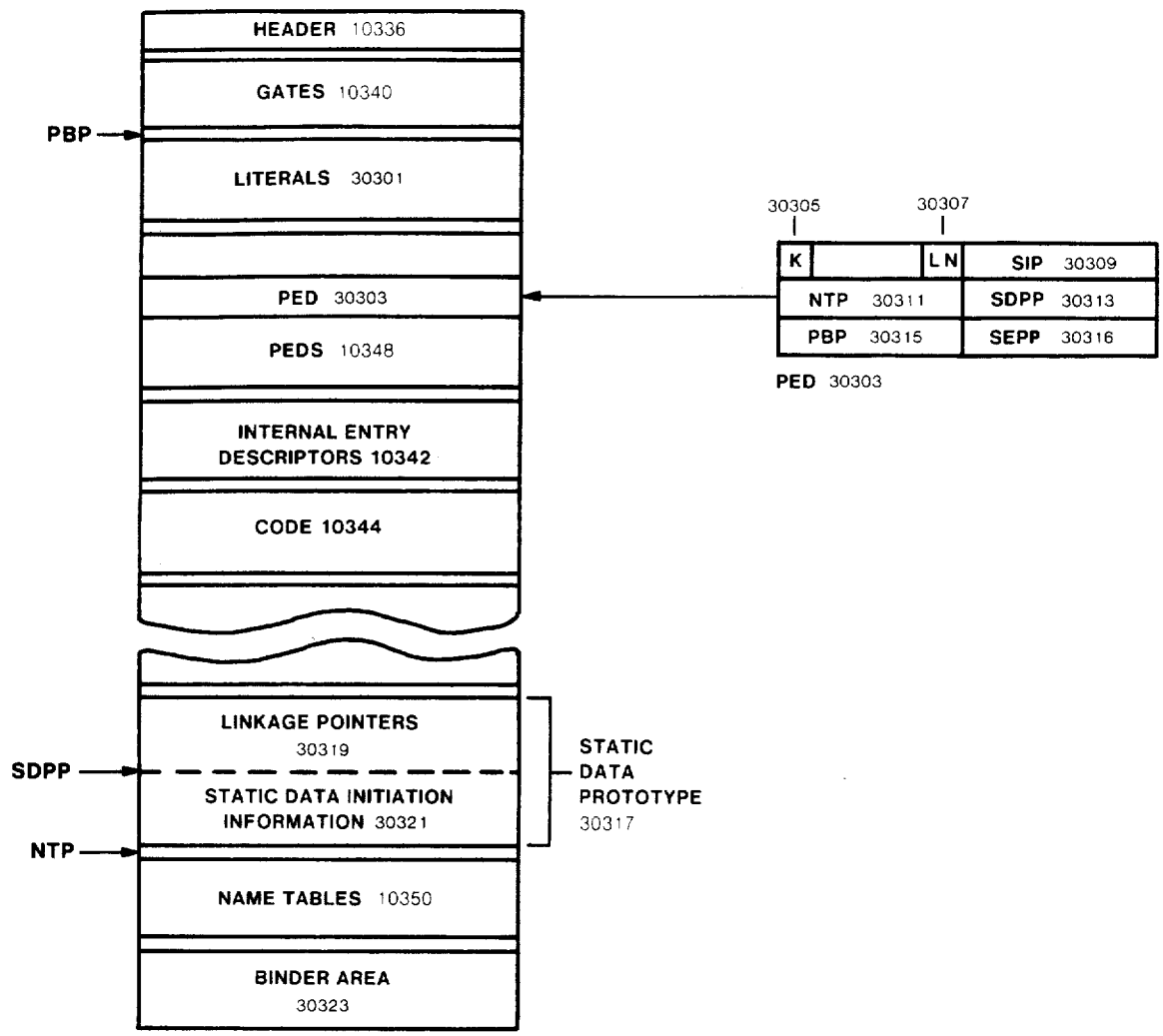
FIG. 303 is a diagram illustrating a namespace overview of a procedure object.
Figure 3:
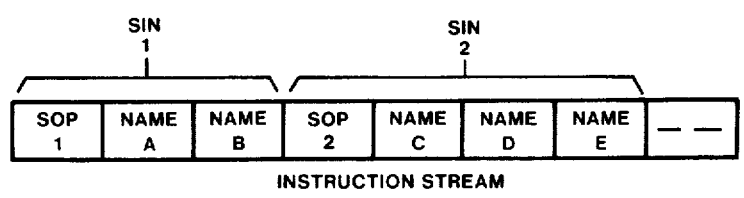
FIG. 3 is a diagram illustrating the computer system instruction stream of the present invention.
Figure 307:
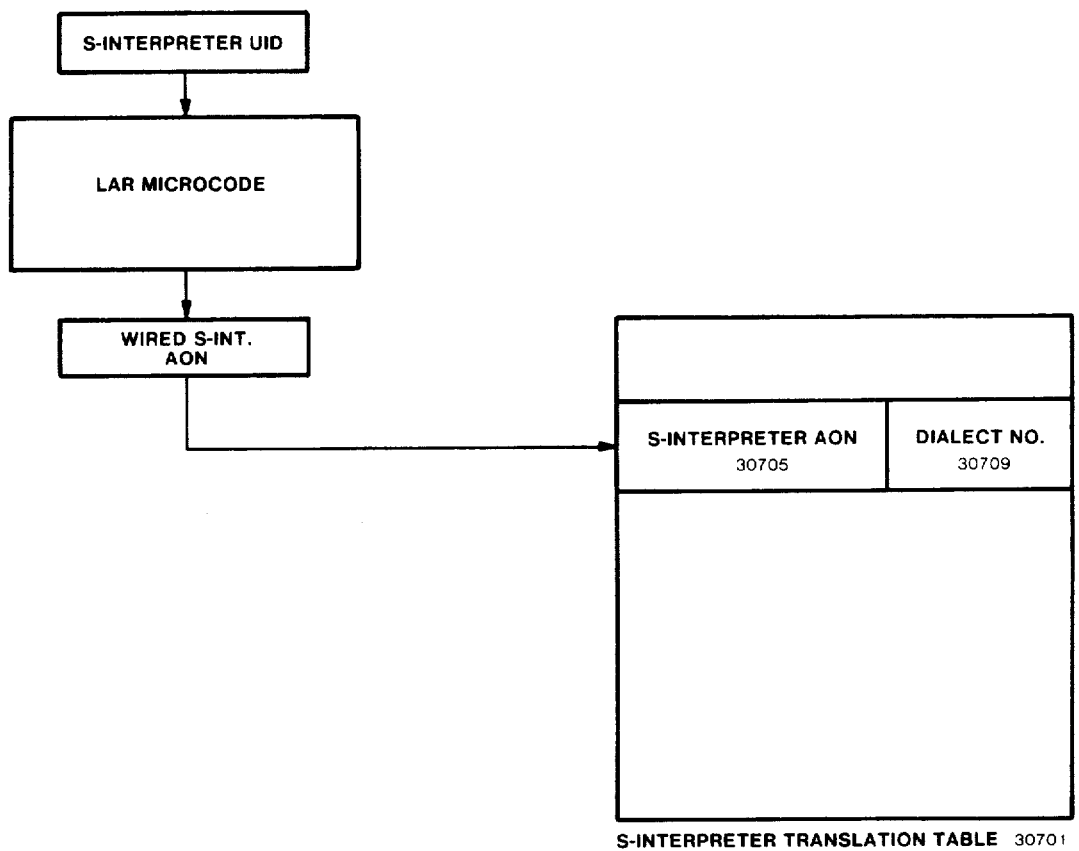
FIG. 307 is a diagram illustrating translation of S-interpreter universal identifiers to dialect numbers.

The preferred embodiments of the present invention are disclosed in Ward Baxter II, et al., Digital Data Processing System having an I/O Means using Unique Address-Providing and Access Priority Control Techniques, U.S. patent application Ser. No. 266,402, filed May 22, 1981. That application, which is owned by the same assignee as the present application, is hereby incorporated by reference into the present application. Particular attention is directed to Chapter 3(B) of that application and to the Figures referred to therein.

We claim:

1. A digital computer system comprising:
   (1) memory means for performing memory operations including storing and providing items of data in response to memory operation specifiers, each one of said memory operation specifiers specifying one said memory operation and an address of one said item of data in said memory means, and wherein said items include
       (A) instructions, each one of said instructions including an operation code of a plurality of operation codes, said operation codes belonging to a plurality of functionally different operation code sets, said operation codes in a given one of said operation code sets being definable solely with reference to said given operation code set, and certain ones of said instructions further including names representing other said items and
       (B) name table entries corresponding to said means, each said corresponding name table entry containing information specifying said address of said item represented by said name to which said name table entry corresponds and
   (2) processor means connected to said memory means for processing said items of data and providing said memory operation specifiers to said memory means in response to said instructions, said processor means including
       (A) operation code decoding means for decoding said operation code in a current instruction of said instructions to which said processor means is currently responding as required by said operation code set to which said operation code in said current instruction belongs,
       (B) name processing means responsive to any said name contained in said current instruction for receiving said name contained in said current instruction and resolving said received name to produce said address of said represented item specified by said corresponding name table entry, and
       (C) control means responsive to said operation code decoding means and to said name processing means for controlling operation of said processor means and providing said memory operation specifiers including said address produced by said name processing means to said memory means.

2. In the digital computer system of claim 1, and wherein: said name table entry contains
   (a) a base specifier of said items specifying a base address of said addresses and
   (b) a displacement specifier of said items specifying a displacement; and
said name processing means produces said address of said represented item by producing said base address specified by said base specifier, producing said displacement specified by said displacement specifier, and adding said displacement to said base address.

3. In the digital computer system of claim 1, and wherein:
   each said instruction is contained in a sequence of said instructions and said processor means responds to said instruction when said processor means performs an execution of said sequence containing said instruction;
   all said operation codes in said instructions in any one said sequence belong to a single said operation code set; and
   each said sequence is associated with a name table of said items containing said name table entries corresponding to said names in said sequence associated with said name table.

4. In the digital computer system of claim 3, and wherein:
   said operation decoding means includes means for storing a dialect value indicating which said operation code set said operation code in said current instruction belongs to and operates to decode said operation code in response to said operation code and said dialect value,
   each said operation code set includes a call operation code specifying a call operation to which said processor means responds by suspending said execution of said sequence currently being performed by said processor means, locating a specified said sequence specified in said instruction containing said call operation code, setting said dialect value to indicate said operation code set to which said instructions in said specified sequence belong, locating said name table associated with said specified sequence, and commencing a said execution of said specified sequence; and
   each one of said operation code sets includes a return operation code specifying a return operation for terminating said execution currently being performed, setting said dialect value to indicate said operation code set to which said instructions in said sequence belong whose said execution was suspended to commence said execution being terminated, locating said name table associated with said sequence whose said execution was suspended, and resuming said suspended execution.

5. In the digital computer system of claim 4, and wherein: said processor means sets said dialect value and locates said name table only in response to said call operation code and said return operation code of said operation codes.

6. In the digital computer system of claim 4, and wherein:
   said items include pointers representing said addresses;
   each said name table is associated with a name table pointer of said pointers representing a said address from which said address of said name table entries in said name table associated with said name table pointer are calculated;
   said name processing means includes a name table address register containing said address represented by said name table pointer associated with said name table associated with said sequence currently being executed;
   each said operation code set is associated with an operation code set identifier of said items of data identifying said operation code set;
   said items of data further include an operation code set identifier translation table associating each said operation code set identifier with said dialect value indicating said operation code set identified by said operation code set identifier;
   each said sequence is associated with a said operation code set identifier specifying said operation code to which said instructions in said sequence belong; and
   said processor means further responds to said call operation by storing said operation code set identifier indicating said operation code set to which said sequence belongs and a said pointer representing said address in said name table register in said memory means, locating said operation code set identifier associated with said specified sequence, using said operation code set identifier translation table to obtain said dialect value associated with said operation code set identifier associated with said specified sequence, and locating said name table pointer associated with said specified sequence and setting said name table address register to said address represented by said located name table pointer; and
   said processor means further responds to said return operation by obtaining said stored operation code set identifier from said memory means and using said operation code set identifier translation table to obtain said dialect value associated with said sequence whose said execution is being resumed and by obtaining said stored pointer and setting said name table address register to said address represented by said stored pointer.

7. In the digital computer system of claim 1, and wherein:
   all of said operation codes have the same size and all of said names in a given said sequence have a single size.

8. In the digital computer system of claim 1, and wherein:
   the forms of said names and of said name table entries and the manner in which said name processing means resolves said names are not dependent on said set of operation codes to which said operation codes in said instructions containing said names belong.

9. In a digital computer system including
   (A) memory means for performing memory operations including storing and providing items of data, said items of data including instructions containing operation codes defining operations and operand syllables representing said items and
   (B) processor means connected to said memory means for responding to said instructions by performing said operations specified by said operation codes on said items represented by said operand syllables, means for interpreting said instructions comprising:
(1) sequences of said instructions in said memory means, each of said instructions including an operation code of a plurality of operation codes, said operation codes belonging to a plurality of functionally different operation code sets, said operation codes in a given one of said operation code sets being definable solely with reference to said given operation code set, and all of said instructions in each said sequence containing said operation codes belonging to one and the same said operation code set of said plurality of different said operation code sets and all of said instructions in each said sequence containing operand syllables having a single size;
(2) an operation code set identifier in said memory means associated with each one of said sequences for specifying which said one operation code set all said operation codes in said instructions in said one sequence belong to;
(3) operation code decoding means in said processor means for receiving said operation code set identifier associated with said sequence currently being executed and said operation codes in said sequence currently being executed and decoding each said operation code in response to said operation code and said operation code set identifier;
(4) operand interpretation means responsive to said operand syllables for interpreting said operand syllables; and
(5) control means responsive to said operation code decoding means and said operand interrpretation means for controlling operation of said processor means.

10. In the instruction interpretation means of claim 9, and wherein:
said operand interpretation means performs one of a plurality of operations in interpreting each said operand syllable; and
said plurality of operations in the same for all said sets of operation codes.

11. In the instruction interpretation means of claim 9, and wherein:
said operand syllables in different said sequences may have different sizes;
each said sequence has associated with it an operand size specifier specifying said one size of said operand syllables in said sequence; and
said processor means further includes parsing means responsive to said control means and to said operand size specifier for receiving said operation codes and said operand syllables and providing said operation codes to said operation code decoding means and said operand syllables to said operand interpretation means.

12. In the instruction interpretation means of claim 11, and wherein:
each one of said operation code sets includes
a call operation code specifying a call operation to which said processor means responds by suspending said execution of said sequence containing said instruction with said call operation code and commencing a said execution of a specified said sequence specified in said instruction containing said call operation code and
a return operation code specifying a return operation to which said processor means responds by terminating said execution of said sequence containing said instruction with said return operation code and resuming said execution which was suspended to commence said terminated execution;
said processor means provides said operation code set identifier associated with said specified sequence to said operation code decoding means and said operand size specifier associated with said specified sequence to said parsing means; and
said processor means provides said operation code set identifier associated with said sequence whose said execution is being resumed to said operation code decoding means and said operand size specifier associated with said sequence whose said execution is being resumed to said parsing means in response to said return operation code.

* * * * *